United States Patent

[11] 3,574,361

| [72] | Inventors | Gilbert E. Contreras |
| | | Los Angeles; |
| | | Frank P. Rindfleisch, Venice, Calif. |
| [21] | Appl. No. | 799,553 |
| [22] | Filed | Feb. 13, 1969 |
| [45] | Patented | Apr. 13, 1971 |
| [73] | Assignee | Aeroquip Corporation |
| | | Jackson, Mich. |

[54] FLEXIBLE JOINT FOR PIPING SYSTEMS
2 Claims, 2 Drawing Figs.

[52] U.S. Cl.................................................. 285/226,
285/300, 285/301, 285/302, 285/397
[51] Int. Cl....................................................... F16l 27/10
[50] Field of Search........................................... 285/301,
300, 299, 226, 9 (Cursory), 298; 285/302, 397,
187

[56] References Cited
UNITED STATES PATENTS
2,616,728  11/1952  Pitt.............................. 285/300X Primary Examiner—David J. Williamowsky
Assistant Examiner—Wayne L. Shedd
Attorney—Jerry K. Harness ABSTRACT: A pair of tubes have short inner sleeves extending therefrom, and a flexible bellows is secured to these sleeves and connects the two tubes. A tubular guide extends from inside one of the sleeves through the other and has an annular stop. There is clearance between the guide and the sleeve through which it extends, thus permitting limited relative lateral shifting of the two tubes. Axial play between the two tubes is limited by engagement of the sleeve surrounding the guide with the first sleeve and with the stop.

PATENTED APR 13 1971

3,574,361

INVENTORS
Gilbert I. Contreras,
BY Frank P. Rindfleisch.

Jerry K. Harness
their ATTORNEY

FLEXIBLE JOINT FOR PIPING SYSTEMS

BACKGROUND OF THE INVENTION

1. Field of the Invention

The invention relates to piping or plumbing systems in which it is desired to allow for deflection and misalignment of connected parts of the system.

2. Description of the Prior Art

Plumbing and piping systems may be classified as rigid or stiff, nonrigid or flexible, or other intermediate combinations. In rigid systems, expansion and rigging deflections are absorbed by loops or bends, that is, by deflecting the basic tubing. In nonrigid systems, these motions are absorbed by the use of slip joints, expansion joints, threaded fittings and other constructions which are sometimes quite complicated and costly, and must be adjusted on the site to accommodate the particular installation.

SUMMARY OF THE INVENTION

The invention comprises a unitary assembly which can be used in any of the above-mentioned types of systems to accommodate misalignment or deflections. Although it will find special usage in rigid systems where tubing must be accurately cut and assembled to minimize misalignment, it may also be used in nonrigid systems to replace the aforementioned expensive and bulky conventional devices for compensating for deflections or misalignments. The invention could find particular use in aircraft and missile applications where size, weight and cost are very important.

The invention consists of a corrugated flexible bellows connecting two tubing or flange ends, each of which has an inner sleeve secured to and extending from it. One of the sleeves also has a tubular guide which extends loosely through the other sleeve and carries an annular stop. The travel distance of said other sleeve between the stop and the first sleeve limits the compression and expansion of the bellows. Limited lateral deflection is also permitted between the two tube ends by the above-noted clearance between the guide and said other sleeve, and the fact that the stop is also spaced inwardly from its adjacent tube end.

A completed unit is attached to the plumbing by welding or similar means in a known manner, and the system or subsystem is then installed. The unit will flex to accommodate installation misalignments without the need for high-rigging loads as the bellows will readily flex. The flange or other connection points are then attached in the normal manner. The limit stops prevent excessive flexing of the bellows, thus preventing the possibility of damage thereto, and will prevent pressure thrust elongation, which might occur if the bellows were unrestrained. Line motion due to thermal changes or other causes will be absorbed by the motion capability of the point which is unused during installation. The guide will also act to minimize turbulence of the fluid flowing through the joint.

DESCRIPTION OF THE PREFERRED EMBODIMENT

Figure 1:
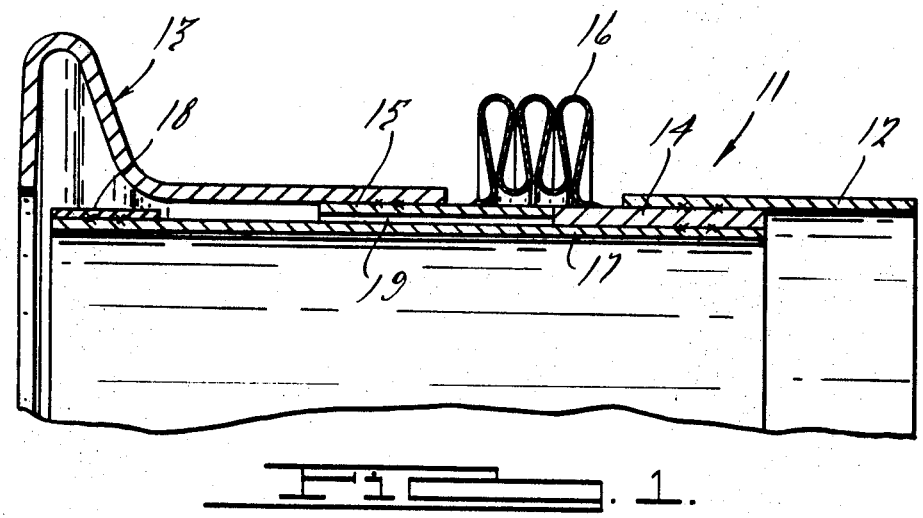
FIG. 1 is a partial cross-sectional view of the unit as shown in its fully compressed condition.

The unit is generally indicated at 11 and comprises a tube end 12 and flange end 13, although it will be understood that other tubular or flange shapes could be used as required. A first sleeve 14 is secured by welding or similar means within the end portion of tube 12 and extends outwardly therefrom. A similar but thinner sleeve 15 is welded within the end of tube 13 and extends outwardly toward sleeve 14. A corrugated flexible bellows 16 bridges sleeves 14 and 15 and is secured to them at its opposite ends.

Figure 2:
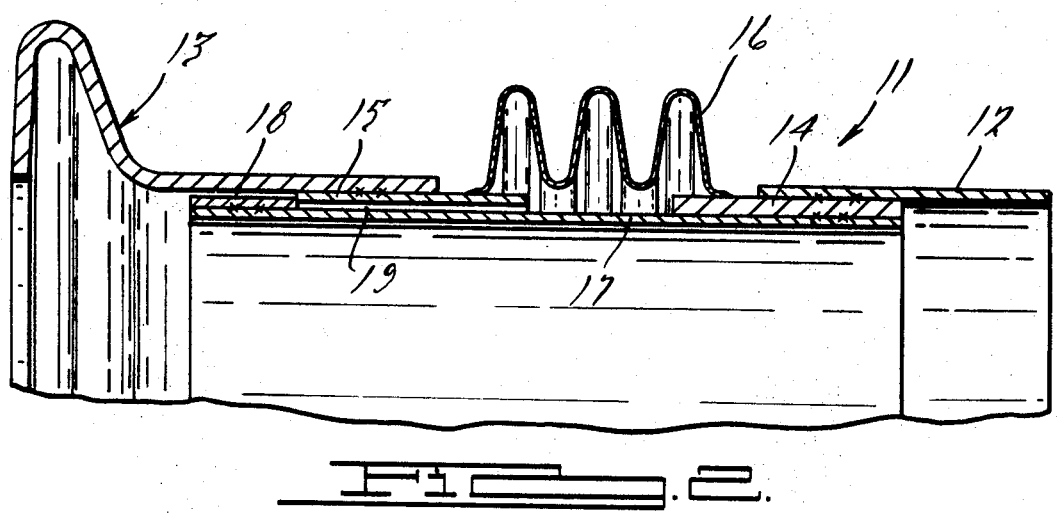
FIG. 2 is a view similar to FIG. 1 showing the unit in its fully extended condition.

A smooth-surfaced guide 17 of tubular shape is welded or similarly secured within sleeve 14 and extends outwardly therefrom through sleeve 15. The outer diameter of guide 17 is somewhat less than the inner diameter of sleeve 15 so that limited lateral play between these parts will be permitted. An annular stop 18 is welded or similarly secured to the end of guide 17 on its outer surface. Guide 18 is thicker than the annular space 19 between sleeve 15 and guide 17, so that the stop will prevent guide 17 from being withdrawn from sleeve 15. The length of guide 17 and the position of stop 18 thereon are such that when the unit is in its fully extended position as seen in FIG. 2, bellows 16 will still not be fully extended, so that overstressing of the bellows will be prevented.

FIG. 1 shows the unit in its fully compressed condition, with sleeve 14 engaging the facing edge of sleeve 15. This will limit the inward axial deflection of the unit. On the other hand, the fully extended position of the unit shown in FIG. 2 will cause stop 18 to engage the adjacent edge of sleeve 15, limiting outward expansion of the unit.

In practice, unit 11 will be attached to a plumbing or piping system in the normal manner by securing tube end 12 or flange end 13 thereto. Upon installation of the system, the unit 11 will flex to accommodate any misalignment without the need for excessive loads being applied, since the unit will readily flex in both lateral and axial directions.

The unit is especially adapted for high temperature and pressure applications. In a typical installation, the unit is in a system which reaches a temperature of 1,000° F. and/or a 500 p.s.i. pressure.

It will be noted that in addition to the convenience of this unit for providing axial, angular or lateral misalignment, it is of relatively light weight and compact dimensions, and will thus be easy to handle in a variety of plumbing or other piping systems.

We claim:

1. In combination, an expansion joint interconnected between first and second axially aligned tubular members of substantially identical inner diameters and permitting a fixed range of outer and inner limits of axial movement between said tubular members, said joint comprising:

a. a first tubular sleeve fixed within the end of said first tubular member;

b. a second tubular sleeve fixed within the end of said second tubular member, said second sleeve having an outer diameter substantially equal to the outer diameter of said first sleeve and an inner diameter slightly larger than the inner diameter of said first sleeve;

c. a third tubular member disposed concentrically in and extending between the ends of said first and second tubular members, said third member having an outer diameter substantially equal to the inner diameter of said first sleeve and having one end thereof fixed within said first sleeve, said third member extending from said first sleeve through and beyond said second sleeve;

d. an annular stop fixed on the outer end of said third member opposite from the end fixed within said first sleeve, said stop having a radial thickness greater than the difference in inner diameters of said first and second sleeves whereby said stop engages one end of said second sleeve to define said outer limit of axial movement between said first and second tubular members, the opposite end of said second sleeve being engageable with said first sleeve to define said inner limit of said axial movement; and e. a bellows fixed between said first and second tubular members and adapted to flex in response to said axial movement.

2. The subject matter of claim 1 wherein said first and second sleeves have extensions extending toward each other beyond the edges of their respective tubular members and said bellows is directly connected between said extensions.